(12) United States Patent
Karaoguz et al.

(10) Patent No.: US 7,904,074 B2
(45) Date of Patent: Mar. 8, 2011

(54) REMOTE CONFIGURATION AND CONTROL OF LOCAL DEVICES VIA A BROADBAND ACCESS GATEWAY

(75) Inventors: Jeyhan Karaoguz, Irvine, CA (US); Marc Abrams, Aliso Viejo, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/093,369

(22) Filed: Mar. 30, 2005

(65) Prior Publication Data

US 2006/0025132 A1      Feb. 2, 2006

Related U.S. Application Data

(60) Provisional application No. 60/563,894, filed on Apr. 16, 2004.

(51) Int. Cl.
*H04M 3/00*      (2006.01)

(52) U.S. Cl. ................. 455/420; 455/418; 455/419; 455/433

(58) Field of Classification Search .......... 455/418–420
See application file for complete search history.

(56) References Cited

U.S. PATENT DOCUMENTS

| | | | |
|---|---|---|---|
| 5,881,134 A | 3/1999 | Foster et al. | |
| 5,963,624 A | 10/1999 | Pope | |
| 6,493,875 B1 | 12/2002 | Eames et al. | |
| 6,751,441 B1 * | 6/2004 | Murray et al. | 455/7 |
| 7,096,011 B2 * | 8/2006 | Kanazawa et al. | 455/421 |
| 2002/0131569 A1 | 9/2002 | Ito et al. | |
| 2003/0171113 A1 * | 9/2003 | Choi | 455/420 |
| 2003/0185365 A1 | 10/2003 | Mansfield | |
| 2005/0064860 A1 * | 3/2005 | DeLine | 455/420 |

FOREIGN PATENT DOCUMENTS

| | | |
|---|---|---|
| EP | 1347625 A2 | 9/2003 |
| EP | 1361741 A1 | 11/2003 |
| WO | WO 0136914 A2 | 11/2001 |
| WO | WO 03023636 A2 | 3/2003 |

* cited by examiner

*Primary Examiner* — Patrick N Edouard
*Assistant Examiner* — Justin Y Lee
(74) *Attorney, Agent, or Firm* — McAndrews, Held & Malloy, Ltd.

(57) ABSTRACT

A system and method for the remote configuration and control of a access devices via a broadband access gateway is disclosed. The broadband access gateway may comprise a wireless interface and a broadband network connection for exchanging information via, for example, a digital subscriber loop, a cable connection, a T1 connection, and T3 network connection. A user using any of a plurality of access devices may communicate with the broadband access gateway via the wireless interface or the broadband network connection to make remote requests of another of the access devices. Such requests may comprise, for example, accessing, recording, playing, exchanging, transmitting, receiving, converting, translating of multimedia information. The remote requests may include enabling, disabling, configuring, monitoring, administering, and scheduling of smart appliances and premise systems such as, for example, security, heating, and cooling systems.

53 Claims, 8 Drawing Sheets

REMOTE CONFIGURATION AND CONTROL OF LOCAL DEVICES VIA A BROADBAND ACCESS GATEWAY

RELATED APPLICATIONS

The present application makes reference to, claims priority to, and claims benefit of U.S. Provisional Patent Application Ser. No. 60/563,894, entitled "Method And System For Handling And Backhauling Traffic From A Wired And/Or Wireless WAN, LAN, And/Or PAN Using A Broadband Access Gateway", filed Apr. 16, 2004, the complete subject matter of which is hereby incorporated herein by reference, in its entirety.

The present application makes reference to U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

The present application also makes reference to U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety.

The present application also makes reference to U.S. patent application Ser. No. 11/095,842, entitled "Registering Access Device Multimedia Content Via a Broadband Access Gateway", filed Mar. 30, 2005, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GH The use of digital media is growing at an extremely rapid pace. Most consumers today have a variety of intelligent devices that gather, store, process, generate, communicate, play back, and/or display information electronically, in a digital form. Examples of such devices include digital still and video cameras, personal digital assistants (PDAs), laptop and desktop personal computer (PC) systems, video cassette recorders (VCRs), personal video recorders (PVRs), document and photo scanners, digital and high definition television sets, stereo audio equipment, and cellular phones, to name only a few. Many of these systems are capable of being configured and/or controlled by an external device such as, for example, a remote control. In addition, residence, office, and business system such as, for example, heating/cooling, security, lighting, and maintenance systems are intelligent. These systems, however, typically limit configuration and control to those physically near the system in question.

Present day consumer equipment that supports the use of remote controls such as, for example, televisions, stereo equipment, and video cassette recorders offer such access within the immediate vicinity of the system being controlled, using a control device customized for and generally supplied by the manufacturer of the controlled system. In most cases, leaving the home/office/business means that control of such systems is no longer available. In addition, when several devices are to be controlled, the consumer may have a collection of remote controls, each for a single device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method supporting remote configuration and control of a plurality of access devices via a broadband access gateway, substantially as shown in and/or described in connection with at least one of the figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate to the seamless merging of wide area networks, from any kind of wired and/or wireless wide area networks, to pockets of wired and/or wireless local area networks and personal area networks, which may be located in homes or other environment such as an office or business. More specifically, aspects of the present invention relate to the remote and local configuration and control of smart appliances and premise systems via a broadband access gateway. Devices and systems to which embodiments of the present invention may be applied include, for example, home entertainment equipment (e.g., televisions, video cassette recorders (VCRs), personal video recorders (PVRs) (e.g., TiVo), stereo equipment), home security systems, home environmental control systems (e.g., heating, air conditioning, lighting), and the like. Access devices that may be used to control such smart appliances and premise systems include, for example, a mobile multimedia handset, a personal computer, and a personal digital assistant (PDA), to name only a few. The remote and local configuration and control of the smart appliances and systems described above may be supported by a broadband access gateway that permits broadband network access via, for example, a personal cellular microcell, a personal area network (PAN), a wired or wireless wide area network (WAN), wireless local area network (WLAN) or other type of network located within a premise such as, for example, a home, office, business, or the like. Services that may be available via such a broadband gateway connection include, for example, access to the public switched telephone network (PSTN); Internet protocol (IP) phone access; extended access to commercial cellular and PCS networks such as, for example, TDMA, CDMA, and GSM; and access to and/or control of a variety of multimedia access devices or networked resources capable of providing streams of images, still pictures, video, and audio; to name only a few. These same networks may enable a user of an access device to control the access devices, smart appliances, and premises systems described above, while the user is away from the location of the broadband access gateway. Examples of multimedia information include streaming video, broadcast video, voice, digital data, text, digitized audio, digitized still images, digitized video, and digitized music. The merging of these various types of networks may enable transparent communication of all types of media between access devices, which may be coupled in a wired or wireless fashion to one or more of these networks. In an embodiment of the present invention, access to services available through a wireless broadband gateway may be simplified, permitting their use by a wider group of users of access devices in, for example, homes, offices, and businesses.

Figure 1:
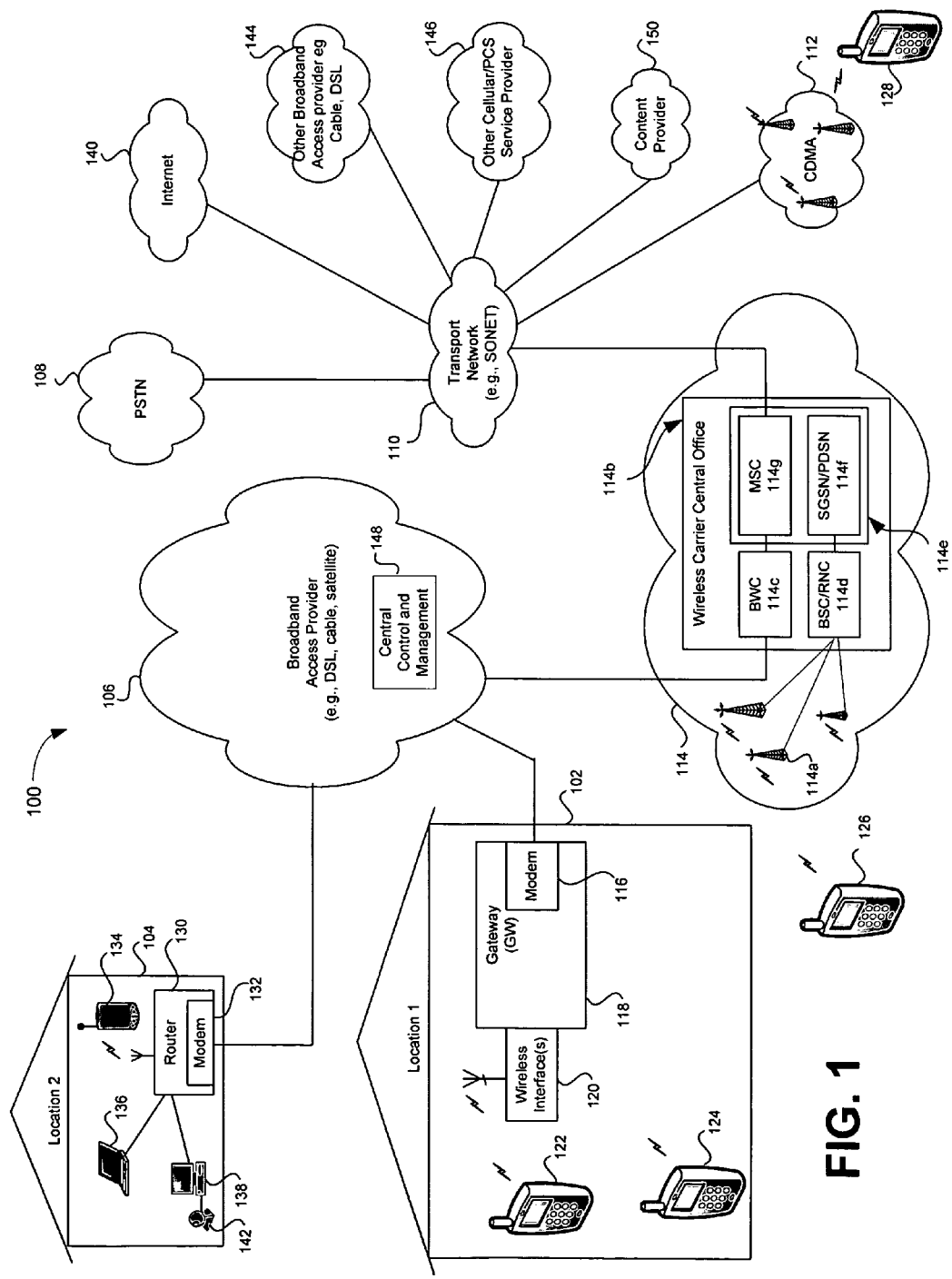
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, public switched telephone network (PSTN) 108, a transport network 110, wireless networks including CDMA network 112 and GSM network 114, and access devices 126 and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11 a/b/g/n, and/or IEEE 802.15.3a ultra-wideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultra-wideband interface, and any combination of an IEEE 802.11a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning and service management. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM networks 112, 114 may comprise a plurality of cell sites (a/k/a cellular towers) that are located in geographical cells within each of the networks. Within the GSM network 114, each of the cell sites such as, for example, cell site 114a may comprise a base transceiver station (BTS), and one or more base transceiver stations (BTSs) may be coupled to wireless carrier central office 114b. The wireless carrier central office 114b may comprise a base station controller/radio network controller (BSC/RNC) such as BSC/RNC 114d. One or more base station controllers/radio network controllers (BSCs/RNCs) may be coupled to the core network 114e, that comprises a network edge switch called a mobile switching center (MSC), such as MSC 114g, and a serving GPRS support node (SGSN)/packet data serving node (PDSN) 114f, of the GSM network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off to.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114a in GSM network 114 towards the wireless interface 120 in the first location 102, the call may be handed off from the cell site 114a GSM network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM network 114 via the broadband connection to the BAP 106 which is connected to the broadband wireless local area network controller (BWC) 114c.

In this illustration, the user is handed off to their PAN, WLAN, or other network located within their home. However, the user could also have been handed off to another network system such as a neighbor's network. In any case, a gateway coupled to the wireless interface which is providing service to the user may communicate at least a portion of the data to, for example, the cable or DSL BAP 106, the GSM network 114, CDMA network 112, other broadband access service provider 144, other cellular/PCS service provider 146 and central control and management block 148. The user may be provided with a notification that indicates the presence of the PAN, WLAN, or other unlicensed network. For example, an icon representative of a personal area network may be displayed on the screen of the access device 126 once a soft or hard handoff is achieved from a serving cell site in GSM network 114 to the wireless interface 120 at the first location 102. A special tone or other audio alert may also be utilized to indicate that the call has switched to the wireless interface 120.

In instances where the gateway 118 detects a compatible access device that may be within the range of the wireless interface 120, the gateway 118 may immediately advertise its available services to the access device. In this regard, the gateway 118 may be adapted to transmit service advertisements to the access device in order to alert a user of the access device of the types of services that are being offered by the gateway 118. Signals containing icons representative of the services may be transmitted to and displayed on a screen of the access device and/or audio alerts may be utilized to notify the user of these services.

In another embodiment of the invention, quality of service (QoS) may also be advertised by the gateway 118. For example, when a user is being serviced by the wireless interface 120, the gateway 118 may advertise that stereo audio is available.

Access devices may be pre-registered so that when they are within the range of the wireless interface 120, the gateway 118 may automatically recognize them. For the pre-registration, an administrator of the gateway 118 at the first location 102 may register access devices that are allowed to access the gateway 118 when they are within the range of the wireless interface 120. Pre-registration may be done prior to the access device accessing the gateway 118. During pre-registration, an administrator or owner of the gateway 118 may enter registration or configuration information such as device IDs of access devices belonging to friends and/or family members into a registration database associated with the gateway 118. As a result, these devices will be allowed to access at least a portion of the services offered by the gateway 118 whenever they attempt to access the gateway 118 by pressing a single button, for example. Opportunistic registration permits a user of an access device to register with the gateway 118 automatically with little or no effort on the part of the user. In this regard, registration information may be sent to the gateway 118 from an access device during an initial access and the gateway 118 may choose to accept or deny the registration. The registration information may be automatically or manually sent to the gateway 118.

In certain instances, an access device may not have been pre-registered to access the network. In this case, one button access may be provided. A single button such as a hard coded button or software-enabled button on an access device may be programmed to transmit identifying information from the access device to the gateway 118. The gateway 118 may utilize this transmitted identifying information to grant or deny access to its services. For example, one button may be programmed to contain access device identifying information related to accessing the services provided by gateway 118 at the first location 102. The gateway 118 may also be adapted to utilize digital certificates to authenticate access devices.

An interactive process may also be provided, whereby the gateway 118 may prompt or request particular information, for example a password from an access device requiring network access. If the particular information is received, then access to at least some of the services provided by the gateway 118 may be granted and if not, the access to at least some of the gateway's services may be denied.

In another embodiment of the invention, the one button access may be provided via software-enabled button (soft button) or hardware-enabled button (hard button). In this regard, the software button may be displayed on a screen of an access device.

A "walled garden" approach may be utilized to provide access to the services that may be offered by a particular gateway, for example, gateway 118. Under the walled garden approach, when an access device first registers or is identified, a basic set of services may be provided by the serving gateway 118 to the access device 124. The basic services offered may vary among each gateway. At least some of the basic services that are provided by a gateway such as gateway 118, may be offered without authenticating the access device 124. However, other services may only be offered if an access device such as access device 124 is properly authenticated. These services that are offered may be services that were advertised by the gateway 118.

In an aspect of the invention, access to additional services may be granted based on, for example, user identity, access device identity and or user input. The services offered to an access device by a gateway may be arranged in a hierarchical structure such as a tier. For example, in a first tier, a user may be prompted to enter membership information such as a member identification number. Upon authentication of the membership identification number, the first tier may provide restricted access with pop-up advertisements that may not be disabled. In a second tier, for example, a user may be prompted to enter a password. Upon authentication of the password, second tier information may provide restricted access to gateway services without pop-up advertisements. In a third tier, for example, entering billing information such as an account number or credit card or check card number may provide unlimited and/or unrestricted access to all the services offered by a gateway. A fourth tier may provide only operating instruction and information for guests.

An administrator of the gateway may establish the type of access provided by the walled garden. For example, if the first location 102 is a hotspot at a Café, the provider of the gateway may establish the service access levels or tiers that may be provided by the gateway 118.

When an access device is within the range of the gateway 118, wireless service is handed off from a serving cell site 114a in the GSM network 114 to the gateway 118. The access device may be authenticated by the gateway 118 and permitted to access at least some of the services offered by the gateway 118. Once the access device is authenticated, at least a portion of the information on the access device may be made available as a networked resource via the gateway 118. A user of the access device may chose whether information on the access device may be made available to the gateway and if so, that information which will be made available, and that information which will be unavailable to the gateway 118. In this regard, where information is made available, the gateway 118 may maintain a list of the resources that may be available on access devices that may be coupled to the gateway 118. For example, a list of contact information, calendar information, audio files, video file and/or data files stored on the access device may be sent to the gateway 118.

The resources that are available on the access device may also be advertised to other access devices that may be in communication with the gateway 118. Advertisement of the resources that may be available on an access device may be restricted to, for example, a list of particular devices, a particular type of devices or to a particular user. Accordingly, a user may have to be properly authenticated prior to certain information being made available to the user. Additionally, advertisement of the resources may cause certain icons representative of the resources to be displayed on other access devices. In a similar manner, icons representative of the resources that may be available on these other access devices may also be presented on the access device.

An access device may be provided with a welcoming screen that may allow a user of a device to sign up for either free or paid services. Once the signup is complete, subsequent access by the user may be authenticated by the gateway 118 utilizing the signup information. Whenever an access device registers with and/or is authenticated by the gateway 118, information on the access device may be updated and/or synchronized with information that may be on the gateway 118.

Devices within the location of the gateway 118 may be configured to register certain portions of their data content with the gateway 118 through a gateway registration process. Once data for these devices is registered to the gateway 118, the gateway may maintain a database, which keeps track of the data that is available, and its location. Accordingly, if the data previously stored in the database is no longer available, then information representative of the previously stored data may be removed from the database. Data from devices coupled to the gateway 118 such as on laptops, CD players, digital video disk (DVD) players, TIVO, personal video recorders (PVRs), personal digital assistants (PDAs) and other devices, may be registered with the gateway 118. This data may comprise audio, video, still pictures, and/or text.

At least a portion of the registered data may be made available to other network access devices via the gateway 118. In an aspect of the invention, the gateway 118 may be adapted to maintain a searchable list of data that may be available via the gateway. In this regard, the gateway may comprise a search engine that may be utilized to locate and distribute data that may be made available through the gateway 118. In another aspect of the invention, data may be made available to access devices via advertising by the gateway 118. Access devices may be configured to seek out particular data that may be of interest. Accordingly, an access device may be adapted to receive and process only those gateway advertisements may fit particular criteria. Those advertisements that may not fit the particular criteria may be discarded or ignored.

When an access device is within the range of the gateway 118, wireless service may be handed off from a serving cell site 114a in the GSM network 114 to the gateway 118. The access device may be authenticated by the gateway 118 and permitted to access at least some of the services offered by the gateway 118. Once the access device is authenticated, a user of the access device may have a desire to locate a particular video presentation. The user may access the search engine, which may have been advertised to the user's access device by the gateway 118. The search engine may appear on the display of the user's access device as an icon. The user may then activate a search by selecting the search engine icon, inputting a name of the video presentation and executing the search.

In another embodiment of the invention, the gateway may be adapted to classify information based on a given criterion. This classification may assist with locating information based on a particular criterion. In this regard, a user of the access device may be presented with a list of classifications and may select one, which may be of interest based on a particular criterion. This may narrow the focus of a search.

The gateway may also be utilized to facilitate seamless synchronization of data between devices that may be wired or wirelessly coupled to the gateway 118. For example, audio files located in a music folder on a PC coupled to the gateway 118 may be synchronized with a wireless media player coupled to a hot spot in an airport while a user of the wireless access media player waits to board a flight. In this regard, the gateway may determine what files need to be synchronized and control how the synchronization is accomplished. The same is true for files that may be downloaded from the PC to the wireless access media player, and for files that may be uploaded from the wireless access media player to the PC. Calendar and/or contact information may also be updated and/or synchronized with a mobile multimedia handset in a similar manner utilizing the gateway 118.

A location-aware service determines an approximate location of a network device and adapts delivery of a particular service application and/or content according to a quality of service criterion. The delivery of location-aware services may be controlled by the gateway 118. For example, a user of an access device may request playback of an audio clip via the gateway 118. After receiving the request for playback of the audio clip, the gateway 118 may determine that a channel between the gateway 118 and the user's access device may only be capable of maintaining a reduced playback rate. As a result, instead of sending 128 kbps encoded audio data, then the gateway may send 96 kbps data. Hence, in a case where the audio data was originally stored in 128 kbps sampled audio data, then the gateway 118 may transcode the 128 kbps sampled data to 96 kbps audio data.

In another illustrative embodiment of the invention, while the GSM network 114 is servicing the access device, lower compression rates may be utilized to provide service to the access device. However, when the access device roams within range of the wireless interface 120 and is being served by the gateway 118 through wireless interface 120, higher compression rates may be utilized. For example, audio data sampled at a data rate of 64 kbps may be utilized for playback on an MP3 enabled telephone while the phone is being serviced by a cell site 114a in the GSM network 114. However, once the MP3 enabled telephone is within the operating range of the wireless interface 120 and is being serviced by the gateway 118, the gateway 118 may automatically adapt to a higher data rate of, for example, 92 kbps or 128 kbps.

Automatic format conversion by the gateway 118 may include converting data from a first format to at least a second format suitable for delivery and/or display on an access device. This may permit data that would otherwise be incompatible with a first access device to be played on that first access device. For the location-aware services based on QoS, data was converted from a first format 128 kbps to a second format 96 kbps to achieve and/or maintain a particular QoS, but the data type remained the same. In this case, the audio format and/or its data type may be different. For example, if the audio format was MP3, then after the conversion, the format remained WAV and/or the sampling rate may have decreased from 128 kbps top 96 kbps.

In conventional wired caller ID systems, a name and/or directory number (DN) of a calling party may be transferred either in-band or out-of-band to a called party and may be displayed on the called party's caller ID display when a call is answered. In these conventional systems, the caller ID information is limited to a callers name, directory number (DN), general location and/or time of call. In wireless telephone systems, in order to save on bandwidth, only a caller's directory number is transferred and displayed to a calling party. However, if the calling party's directory number and name is stored in the called party's phone, then the stored name and stored directory number will be presented on a display of the called party's terminal. In this case, the stored directory number is compared with the transferred caller's directory number, and if a match occurs, then a name corresponding to the matching directory number is also displayed on the called party's terminal.

In accordance with an embodiment of the invention, the gateway 118 is adapted to determine the appropriate caller ID information that may be displayed in a called and/or calling party's caller ID. In this case, reverse caller ID information may be displayed on both a calling and a called parties terminal by the gateway 118.

If a called and/or calling device is a mobile multimedia handset and/or laptop, for example, contact or other personal information may be displayed the caller's and/or calling party's directory number. The level or amount of information that may be displayed may be varied. Certain sensitive information relating to either the called or calling party may be restricted from being displayed.

In current cellular communication systems, over the air (OTA) programming is utilized to program a cellular telephone during the provisioning process. In some instances, cellular providers have established websites that may be utilized or OTA programming. In this regard, a cellular subscriber may access the website and enter information such as the assigned directory number and the electronic serial number of the cellular telephone being programmed.

In accordance with a representative embodiment of the invention, an access device may be registered using over the air programming via the gateway 118. A user of an access device may send access device information to the gateway 118 using, for example, a default interface that may be presented to and displayed on a screen of the access device when the access device first enters the service area of the wireless interface 120. During registration, the capabilities of an access devices may be sent to the gateway 118 and may be shared with devices that may be coupled to the gateway 118.

Since the gateway acts as a registrar of information for all the access devices that may be wired or wirelessly coupled to it, the gateway may function as a personal digital assistant for any of these access devices. In an illustrative example, a first device, a first PC and a second PC are being serviced by the gateway 118. The first access device receives a call and the caller ID information shows the callers name, home directory number and home address. However, the first PC contains the business address for the caller and the second PC contains the monthly calendar information for the caller. Assume that the caller had a desire to setup a business meeting. In accordance with an aspect of the invention, the gateway 118 may be adapted to provide the business address of the caller to the first access device and also provide the caller's calendar to the first access device. In this manner, the network centrally provides all the information necessary for scheduling the meeting. In this example, the first PC may belong to the user of the first access device and the second PC may belong to the caller.

This concept may be extended to a look-up or 411 directory assistance on the Internet. The lookup may also be location dependent. In this regard, if a user is located in Hollywood and requests a hotel location, the gateway 118 may only cause the hotels that are located in Hollywood to be displayed to the user.

The gateway 118 may also be adapted to create profile information based on data usage. These created profiles may be utilized to create social networks for people having common interests. Accordingly, users may be permitted to post their interests and also select those people having similar interests based on the created profile. Based on the created profile information and the posted user interests, the gateway 118 may also generate a list of those people who have similar interest and also those users that may potentially have similar interests.

Given the capability to seamlessly operate an access device as one migrates from outside the home into the home, it is desirable to have a single device that may be adapted to control at least some of the devices that may be found within the home. In addition to its normal voice or data communication operating mode, an access device may be configured to operate as a universal remote that may be utilized to remotely control a plurality or other devices such as a TV, DVD, CD, Stereo, display monitor, or a combination thereof. Most access devices currently have an IR transmitter, which may be adapted to communicate with other IR receiver devices.

The access device may be used for wireless communication and for remotely controlling an electronic device with as a TV, CD/DVD recorder/player, or other device. The access device may also include at least one soft-button that may be enabled through the gateway 118 and may be utilized to control any other device that may be coupled to the gateway 118.

The gateway 118 is adapted to virtually aggregate data that may be visible from a plurality of access devices or other network devices. Although the gateway 118 may be adapted to store some service and content related information, the gateway 118 does not actually store copies of data that resides the access devices and/or other network devices that may be wired or wirelessly coupled to it. However, the gateway 118 may store, for example, metadata information that may be utilized to locate and access the information stored on the access devices and/or other network devices. The gateway is therefore adapted to function as a registrar of both service and content related information.

Whenever an access device registers with and/or is authenticated by the gateway 118, information may be collected from the access device and related metadata information may be updated and/or synchronized with information that may be currently stored on the gateway 118. Additionally, when a device is no longer being serviced by the gateway 118, associated information may be released from the gateway 118. In this regard, the virtual aggregations function performed by the gateway 118 guarantees that the most current information is accessible from the access devices.

Figure 2:
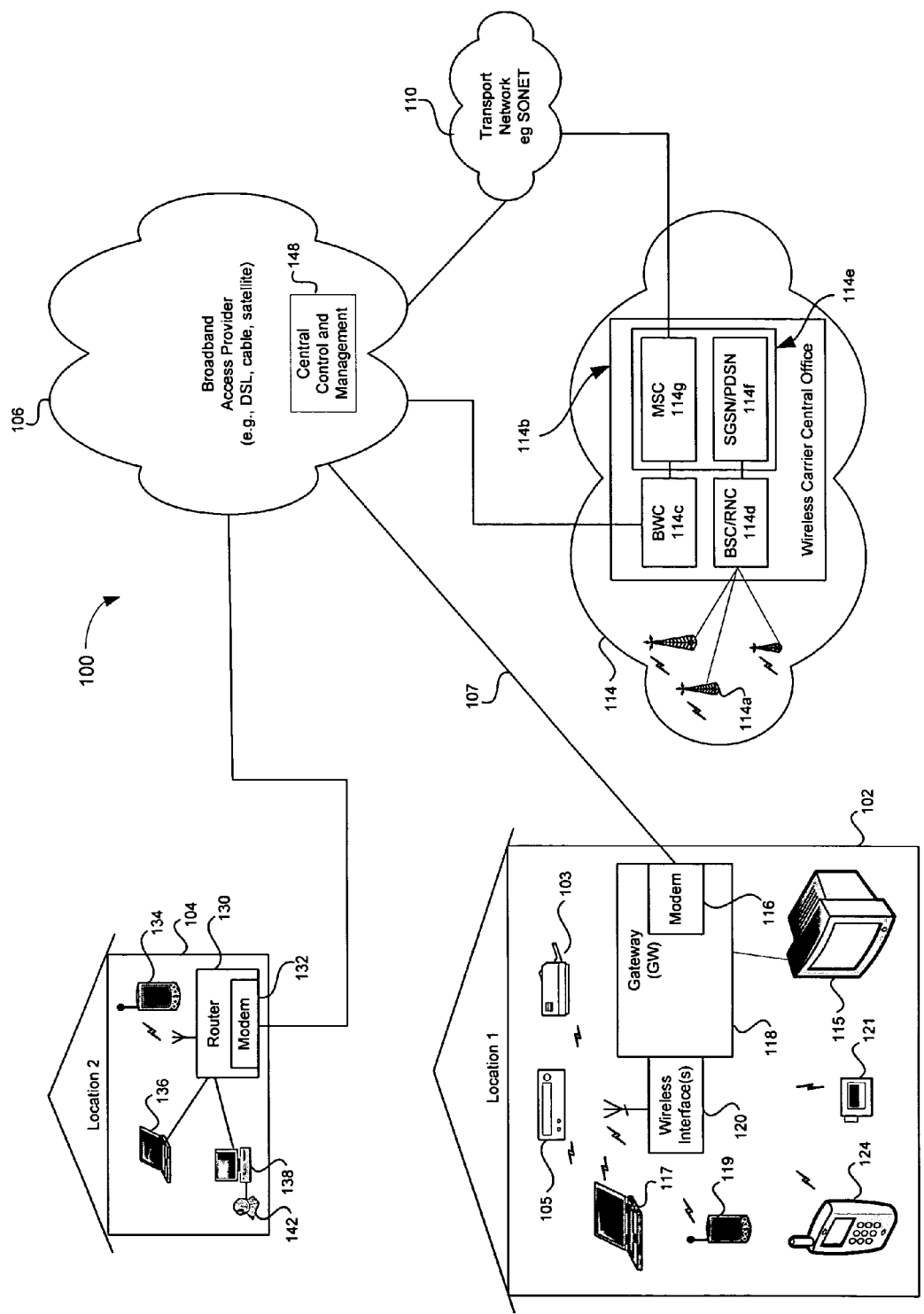
FIG. 2 shows a block diagram illustrating an exemplary communication system, in accordance with a representative embodiment of the present invention.

FIG. 2 shows a block diagram illustrating an exemplary communication system 100, in accordance with a representative embodiment of the present invention. The communication system 100 shown in FIG. 2 comprises a wireless interface 120, a gateway (GW) 118 with a modem 116, and an array of access devices such as, for example, a printer 103, a stereo receiver 105, a laptop 117, a wireless personal digital assistant (PDA) 119, and a digital video camera 121, at location 102. The communication system 100 of FIG. 2 also comprises an access device 124 that may correspond, for example, to the access devices 122, 124, 126 of FIG. 1. A second location 104 within communication system 100 comprises a router 130 with a modem 132, and a plurality of wireless access devices. The plurality of access devices at the second location 104 may, for example, comprise a personal computer (PC) 138, a laptop 136, and a wireless personal digital assistant (PDA) 134. A peripheral such as, for example, a digital camera 142 may be coupled to the personal computer 138. Other peripherals such as, for example, printers, digital scanners, speakers, and the like, that are not shown in FIG. 2, may also be coupled to the personal computer 138 and/or laptop 136. The wireless interface 120 may comprise a plurality of interfaces such as, for example, a Bluetooth interface, a cellular interface, and any combination of an IEEE 802.11 a, b, g, and/or n interface, and/or an IEEE 802.15.3a ultra-wideband interface. Although the following discussion refers frequently to the capabilities and actions of the gateway 118 and wireless interface 120, the same may be said of the router 130 with modem 132 of FIGS. 1 and 2, for example, without departing from the spirit and scope of the present invention.

In accordance with a representative embodiment of the present invention, a wireless access device such as access device 124 may be mobile, and may move between the personal area network/wireless local area network coverage provided by wireless interface 120 at location 102, the wide area network coverage provided by, for example, GSM network 114, and the coverage provided by the router 130 and modem 132 at location 104. The location 102 may, for example, be the home of the user of the access device 124, the home of a friend or relative of the user of access device 124, or an office, business, etc., where the user of access device 124 may travel. The location 104 may, for example, be a second home of the user of access device 124, the home of a friend or relative, an office, or may have no personal or business relationship with the user of access device 124. In a representative embodiment of the present invention, the gateway 118 may comprise, for example, a set top box that may be coupled in a wireless or wired fashion to access devices such as, for example, a laptop computer or television, such as the laptop 117 and the television 115 of FIG. 2. Access to the communication bandwidth of a broadband network as previously described may be provided by the gateway 118 and the modem 116 to wired or wireless access devices in the vicinity of location 102, and via router 130 and modem 132 to wired or wireless access devices in the vicinity of location 104, as shown in FIG. 2. This architecture may provide extended access to wireless networks such as, for example, the GSM network 114, CDMA network 112, other cellular/PCS service provider 146, Internet 140 and public switched telephone network 108, of FIG. 1. The modem 116 is shown connected to a broadband access provider (BAP) 106 via a broadband connection 107. The broadband connection 107 may comprise, for example, a digital subscriber line (DSL) connection, a cable network connection, a satellite connection, a T1 or T3 network connection, or similar broadband communication link. The modem 116 is compatible with the broadband connection 107, and may be, for example, a DSL modem, a DOCSIS-compliant cable modem, a satellite service modem, or T1 or T3 compatible modem-type device. The broadband connection may provide access through BAP 106 to location 104, and via transport network 110 to, for example, GSM network 114.

In the example illustration of FIG. 2, a user of the access device 124 may or may not be engaged in communication with another system or subscriber accessible via the GSM network 114, or other wide area network of FIG. 1. Although the present example of FIG. 2 shows a GSM network 114, a representative embodiment of the present invention may be employed with respect to other wide area networks such as, for example, the CDMA network 112 and other cellular/PCS service provider 146, shown in FIG. 1.

When an access device such as, for example, the access device 124 of FIG. 2 moves into the coverage area of a personal area network/wireless local area network of, for example, the wireless interface 120 and gateway 118, or the router 130, the access device 124 may be authenticated by the gateway 118 or router 130. The authentication may involve the sharing or exchange of identification and/or authentication information by the access device 124 with the gateway 118 or router 130. Details of an example of such an interaction are provided in U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety. Once the access device 124 has been authenticated to the gateway 118, the access device 124 may be permitted to exchange multimedia information and services available via the access devices in communication with the gateway 118, or via networks connected to the gateway 118. Information about the available multimedia information and services may be shared by and/or with the access device 124 via information exchanged by the access device 124 and the gateway 118 or router 130. Additional information about the advertising of such information may be found in U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety. In a representative embodiment of the present invention, a broadband access gateway such as, for example, the gateway 118 or the router 130 of FIG. 2 may maintain a database of the information about the available multimedia information and services, described above. Details of an example of such a database of information about access device data may be found in U.S. patent application Ser. No. 11/095,842 entitled "Registering Access Device Multimedia Content Via A Broadband Access Gateway", filed Mar. 30, 2005, the complete subject matter of which is hereby incorporated herein by reference, in its entirety.

In a representative embodiment of the present invention, the access device 124 of FIG. 2 may comprise, for example, a mobile multimedia handset, a pager, a personal digital assistant (PDA), a laptop, a personal computer (PC), and other electronic devices having similar multimedia communication capability. Many access devices like those listed above have the basic input/output functionality necessary to enable them to act as a configuration and/or control device for a wide variety of other access devices that may be referred to as, for example, smart appliances and premise systems. Smart appliances may comprise, for example, entertainment devices such as televisions, video cassette recorders (VCRs), personal video recorders (PVRs) (e.g., "TiVo" type devices), compact disc (CD) and digital versatile disc (DVD) players and recorders, stereo equipment, microwave ovens, refrigerators, freezers, washers and driers, and dishwashers. Premise systems may comprise, for example, security systems, and environmental control systems such as, for example, heating, air conditioning, lighting, and swimming pool filtration and heating systems, to name just a few. Each of the above access devices, smart appliances, and premise systems may be capable of behaving in a number of ways. A large number of the mobile multimedia handsets, personal digital assistants, and laptop computers on the market are equipped with a display, a keypad or touch screen input device, and one or more of a Bluetooth, IEEE 802.11 (e.g., WiFi), and infrared wireless interface. Access devices such as these may act as suitable remote controls for initiating configuration and control behaviors available from other access devices including, for example, smart appliances and premise systems, using one or more of these interfaces. In a representative embodiment of the present invention, such access device, smart appliances and premise systems may be capable of communicating with a broadband access gateway such as, for example, the gateway 118 or router 130 of FIGS. 1 and 2, using any combination of interfaces such as, for example, wired power line carrier or Ethernet interfaces, or wireless interfaces such as, for example, a Bluetooth, an IEEE 802.11, an IEEE 802.15.3a ultra-wideband interface, and an infrared interface.

Figure 3:
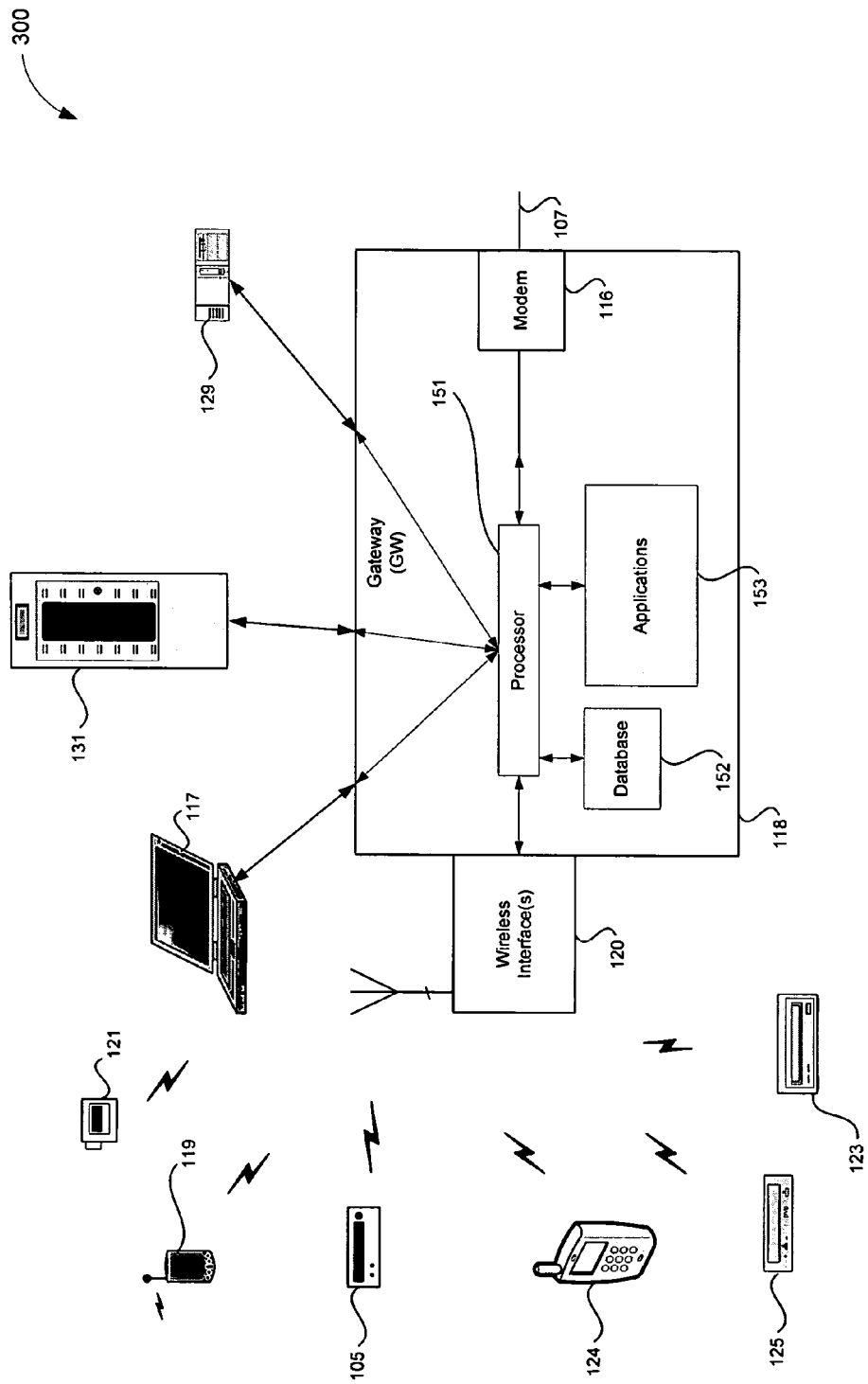
FIG. 3 shows a block diagram of an exemplary communication system that supports local and remote configuration and control via a broadband access gateway, in accordance with a representative embodiment of the present invention.

FIG. 3 shows a block diagram of an exemplary communication system 300 that supports local and remote configuration and control via a broadband access gateway, in accordance with a representative embodiment of the present invention. The communication system 300 of FIG. 3 comprises a gateway 118 that may correspond, for example, to the gateway 118 or the router 130 of FIG. 2. The gateway 118 in FIG. 3 comprises a processor 151 that is communicatively coupled to a wireless interface 120, a modem 116, a laptop 117, an environmental control unit 131, and a security system 129. The wireless interface 120, the modem 116, and the laptop 117 may correspond, for example, to the wireless interface 120, the modem 116, and the laptop 117 of FIG. 2. The modem 116 may provide the gateway 118 with access to a broadband connection 107 that may, for example, comprise a digital subscriber line (DSL) connection, a cable network connection, a satellite connection, a T1 or T3 network connection, or similar broadband communication link to a broadband access provider (BAP) 106. As shown in FIG. 3, the wireless interface 120 is communicatively coupled to a number of access devices including the access device 124, a wireless personal digital assistant 119, a stereo system 105, a digital versatile disc (DVD) unit 125, a personal video recorder (PVR) 123, and a digital video camera 121. The access devices shown in FIG. 3 may correspond, for example, to the access devices in FIG. 2 having the same numbering. The communication system 300 of FIG. 3 also comprises a database 152 and applications 153 that are accessible to the processor 151. The wireless interface 120 may comprise any combination of interfaces such as, for example, a Bluetooth interface, an IEEE 802.11 a, b, g and/or n interface, an IEEE 802.15.3a ultra-wideband interface, and an infrared interface. In addition, the access device 124 and PDA 119 may be capable of communication via either or both of the wireless interface 120 and a wireless wide area network (WAN) such as, for example, the GSM network 114 of FIG. 2.

The broadband access gateway in a representative embodiment of the present invention may facilitate the configuration and control of access device, smart appliances, and premise systems by a user of an access device such as, for example, the access device 124. A broadband access gateway such as, for example, the gateway 118 of FIG. 3 may receive requests from and provide feedback to a user of an access device such as, for example, the access device 124. The applications 153 within the gateway 118 may communicate the requests and feedback information between the access device 124 of the user, and the access devices, smart appliances, and premise systems such as, for example, the stereo system 105, the digital versatile disc (DVD) unit 125, the personal video recorder (PVR) 123, the environmental control unit 131, and the security system 129 that are in communication with the gateway 118. In a representative embodiment of the present invention, the requests may relate to, for example, media-related services including, for example, the accessing, recording, playing, exchanging, transmitting, receiving, converting, and translating of multimedia information, access to information about media availability and media sources and services, and fee-based media services. The request may also relate to, for example, the enabling, disabling, configuring, monitoring, administering, and scheduling of smart appliances, security systems, and environmental control systems.

In a representative embodiment of the present invention, the gateway 118 may receive the request in the form of a message. The message received by the gateway 118 may not be compatible with the access device that is to act upon the request. In a representative embodiment of the present invention, the applications 153 may be capable of adapting commands/requests from access devices such as, for example, the access device 124 and wireless PDA 119 to a form that is compatible with another access device, smart appliance, or premise system that is in communication with the gateway 118 such as, for example, the stereo 105, the PVR 123, and the environmental control system 131. The applications 153 may also adapt messaging from a responding access device, smart appliance, or premise system for use by an access device such as, for example, the wireless PDA 119 or the access device 124.

In another representative embodiment of the present invention, the gateway 118 may provide to the access device 124 one or more of executable code, a script, and an applet such as, for example, a java applet, in order to enable the access device 124 to present a user interface with a more consistent or friendly "look and feel", or to allow the access device 124 to communicate user requests directly to the access device being remotely configured and/or controlled. For example, an access device such as wireless PDA 119 may be provided by the gateway 118 with executable code, a script, or an applet, to enable the wireless PDA 119 to communicate directly with, for example, the PVR 123 of FIG. 3, using a built-in interface such as, for example, an infrared interface, a Bluetooth interface, an IEEE 802.15.3a ultra-wideband interface, or an IEEE 802.11 a/b/g/ or n interface. The gateway 118 may determine the capabilities of the PVR 123, and the executable code, script(s), or applet(s) needed by the wireless PDA 119, based upon identification information provided in earlier communication with the wireless PDA 119 and PVR 123 such as, for example, during a registration or identification activity when the access device first enters into communication with the broadband access gateway, or at some later time. Such identification information may comprise, for example, an electronic serial number, an Internet protocol (IP) address, a media access control (MAC) address, an International Mobile Station Identifier (IMSI) address, a Mobile Identification Number (MIN) address, a manufacturer identifier, a model identifier, and a type identifier.

Figure 4:
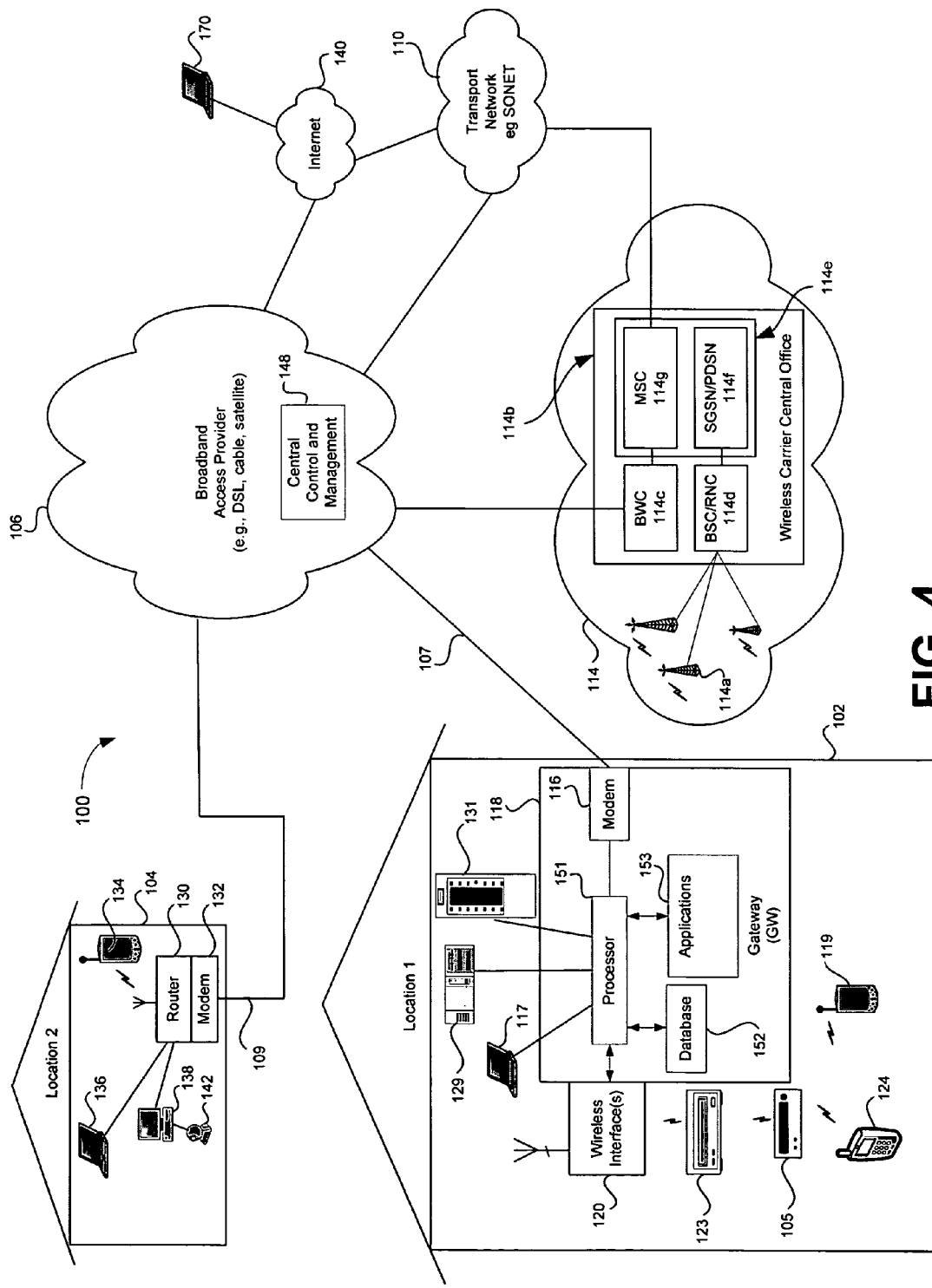
FIG. 4 is a block diagram illustrating an exemplary communication system in which remote configuration and control by an access device outside of the wireless coverage area of a broadband access gateway is supported, in accordance with a representative embodiment of the present invention.

FIG. 4 is a block diagram illustrating an exemplary communication system 300 in which remote configuration and control by an access device outside of the wireless coverage area of a broadband access gateway is supported, in accordance with a representative embodiment of the present invention. The communication system 300 of FIG. 4 comprises, at a first location 102, a gateway 118 that may correspond, for example, to the gateway 118 shown in FIGS. 2 and 3, and at a second location, a router 130 that may correspond, for example, to the router 130 shown in FIGS. 1 and 2. The gateway 118 is communicatively coupled to a wireless interface 120, a modem 116, a laptop 117, a environmental control unit 131, and a security system 129. The wireless interface 120, the modem 116, and the laptop 117 may correspond, for example, to the wireless interface 120, the modem 116, and the laptop 117 of FIG. 2. The gateway 118 may use the modem 116 to access a broadband connection 107 that may, for example, comprise a digital subscriber line (DSL) connection, a cable network connection, a satellite connection, a T1 or T3 network connection, or similar broadband communication link to a broadband access provider (BAP) 106. As shown in FIG. 4, the gateway 118 may use the wireless interface 120 to communicate with a number of access devices including, for example, the access device 124, a wireless personal digital assistant 119, a stereo system 105, and a personal video recorder (PVR) 123. The access device 124 of FIG. 4 may correspond, for example, to the access device 124 or wireless PDA 119 of FIG. 2. The communication system 300 of FIG. 4 also comprises a database 152 and applications 153 that are accessible to the processor 151. The wireless interface 120 may comprise any combination of interfaces such as, for example, a Bluetooth interface, an IEEE 802.11 a, b, g and/or n interface, an IEEE 802.15.3a ultra-wideband interface, and an infrared interface. In addition, the access device 124 and PDA 119 may be capable of communicating via either or both of the wireless interface 120 and a wireless wide area network (WAN) such as, for example, the GSM network 114 of FIG. 2.

The router 130 shown in FIG. 4 is communicatively coupled to a laptop 136 and to a personal computer (PC) 138 with video camera 142. The router 130 is also in wireless communication with a wireless personal digital assistant 134. The laptop 136, personal computer (PC) 138, video camera 142, and wireless PDA 134 may correspond, for example, to the laptop 136, personal computer (PC) 138, video camera 142, and wireless PDA 134 shown in FIG. 2. The router 130 of FIG. 4 may communicate via a broadband connection 109 that may comprise, for example, a digital subscriber line (DSL) connection, a cable network connection, a satellite connection, a T1 or T3 network connection, or similar broadband communication link to the broadband access provider (BAP) 106 using a modem 132. In the illustration of FIG. 4, the communication system 300 also comprises a laptop 170 communicatively coupled to the Internet 140. As shown in FIG. 4, the Internet 140 is communicatively coupled to the BAP 106, allowing the laptop 170 to communicate with either the gateway 118, or the router 130. The GSM network 114 may also communicate via the BAP 106 using capabilities of the transport network 110.

In a representative embodiment of the present invention, a user of an access device such as, for example, the access device 124 of FIG. 4 may transition back and forth between the coverage area of the wireless interface 120 connected to gateway 118, and service provided by a wireless wide area network (WAN) such as, for example, the GSM network 114. While within the coverage area of the wireless interface 120, the user may employ the access device 124, and the applications 153 of the gateway 118 to, for example, configure or control the environmental control system 131, or to program the personal video recorder (PVR) 123. A description of the configuration of an exemplary environmental control system is given below with respect to FIG. 5. At another time, the user of the access device 124 may be away from location 102 and the communication capabilities provided by the wireless interface 120 and the gateway 118, and may travel within the coverage area of the GSM network 114, or may arrive at the location of the laptop 170. In a representative embodiment according to the present invention, the user of access device 124 may communicate with the applications 153 at the gateway 118 via a wide area networks such as, for example, the GSM network 114 or similar elements of the communication network 300. This aspect of a representative embodiment of the present invention permits the user of the access device 124 to perform the same configuration and control functions using the access device 124 while being served by the GSM network 114, or using the laptop 170 via the Internet 140, that are available while using the access device 124 within the coverage area of the wireless interface 120 of gateway 118. Similarly, the user of the access device 124 may also travel to location 104 and may, for example, enter into communication with the router 130. In a representative embodiment of the present invention, the user of the access device 124 may perform the same configuration and control actions at location 104 using the access device 124, laptop 136, wireless PDA 134, and PC 138, that are available via, for example, the laptop 117, wireless PDA 119, and access device 124 while at location 102.

In another representative embodiment of the present invention, remote configuration and/or control of a broadband access gateway or access device such as, for example, the gateway 118 and/or access device 124 of FIG. 4 may be performed by an entity outside of location 102. For example, an entity accessible via the broadband connection 107, the BAP 106, and the transport network 110 may remotely configure the gateway 118, and/or any of the access devices in communication with the gateway 118 such as, for example, the access device 124, the wireless PDA 119, the stereo system 105, and the PVR 123. In this manner, a representative embodiment of the present invention may include an Internet-based service, that may be operated to remotely configure broadband access gateways and access devices such as those described above, for users of such devices. Security functionality may be employed by such a remote service to permit secure remote access to configuration and control aspects of broadband access gateways, routers, and access devices via broadband network connections such as those described above, by the manufacturer of such devices, and by third party service organizations.

In a representative embodiment of the present invention, an access device such as, for example, the laptop 117, the wireless PDA 119, the PVR 123, and the stereo system 105 may register with the gateway 118 upon entering into, or periodically while in communication with the gateway 118. An access device such as those described above may be capable of providing various services via the gateway 118 to other access devices. An access device may inform the gateway 118 of the fact that it is capable of being remotely configured and/or controlled, and of the actions or services that are available. The gateway 118 may record such information in a database such as, for example, the database 152. An example of such a system may be found in U.S. patent application Ser. No. 11/039,020, entitled "Method And System For Providing Registration, Authentication, And Access Via A Broadband Access Gateway" (Attorney Docket No. 15724US02 BU3607.3), filed Jan. 18, 2005, the complete subject matter of which is hereby incorporated herein by reference, in its entirety.

In a representative embodiment of the present invention, the applications code of a broadband access gateway such as, for example, the application 153 of the gateway 118 shown in FIG. 4 may be automatically updated to support the services, functions, and capabilities of the access devices, smart appliances, and premise systems with which it is in communication. For example, when an access device such as, for example, the personal video recorder (PVR) 123 becomes known to the gateway 118 (as described above), the gateway 118 may update the applications 153 to permit local and remote configuration and control of the PVR 123 by the various access devices in the communication system 300 of FIG. 4. The applications 153 of the gateway 118 may be capable of providing a suitable user interface for a variety of access devices by using information received when each access device enters into communication with the gateway 118 such as, for example, during registration, as discussed above. A broadband access gateway in accordance with the present invention may determine the capabilities of an access device, smart appliance, or premise system by using information such as, for example, the make, model, etc. of the access device, smart appliance, or premise system. This may permit the broadband access gateway to adjust for differences in functionality between, for example, different video cassette recorders or security systems. This may permit the gateway to provide a user interface with a more consistent "look and feel" for a variety of access device, smart appliances and premise systems, and may free the user from the need to understand the peculiarities of any particular access device, smart appliance, or premise system.

In a representative embodiment in accordance with the present invention, the detection of the presence of a particular access device may initiate a change in the operation of a broadband access gateway such as, for example, the gateway 118 or the router 130 of FIG. 4. For example, as described above, the gateway 118 in the communication system 300 of FIG. 4 may receive identity information from an access device such as, for example, the access device 124, that identifies and/or authenticates the access device 124 to the gateway 118. The establishment of the access device 124 as authentic and authorized to occupy the premise of location 102 may prompt the gateway 118 to, for example, change the state of the residential security system 129. This action by the gateway 118 and residential security system 129 may require user input such as, for example, a personal identification number (PIN) or a password. However, for less critical actions such as, for example, changes to the environmental control system 131, the change from an "AWAY" to a "HOME" mode may be made without user input. When the gateway 118 interacts with an access device, smart appliance, or premise system on behalf of a user, the gateway 118 may notify the user of the results. In a representative embodiment of the present invention, a broadband access gateway in a home, office, or business having, for example, multiple wireless interfaces located throughout the premise may facilitate adjustments to a premise system such as, for example, the environmental control system 128, to adjust temperature or lighting as a user of an access device such as, for example, the access device 124, moves from one area of the building to another.

A broadband access gateway in accordance with the present invention such as, for example, the gateway 118 of FIG. 4, may use the information in the database 152 to advertise the presence of such configurable and/or controllable access devices, to other access devices with which it is in communication. For example, in the illustration of FIG. 4, the gateway 118 may advertise to the access device 124, the wireless PDA 119, and the laptop 117, the availability of the services of all of the access devices known to the gateway 118. Additional details of such a system may be found in U.S. patent application Ser. No. 11/029,294, entitled "Method And System For Extended Network Access Services Advertising Via A Broadband Access Gateway", filed Dec. 23, 2004, the complete subject matter of which is hereby incorporated herein by reference, in its entirety. An access device such as, for example, the access device 124 that is equipped to support the configuration and/or control of other devices, may display to the user of the access device 124 textual or graphical information informing the user of the other access devices, smart appliances, and premise systems that support remote configuration and/or control. An example of the display of such information is described below with respect to FIG. 3A.

In a representative embodiment according to the present invention, the communication path between an access device such as, the access device 124, and a broadband access gateway such as, for example, the gateway 118 may be bi-directional, as described above. This enables the access device 124 to be made aware of the status of the access devices, smart appliances, and premise systems.

Figure 5A:
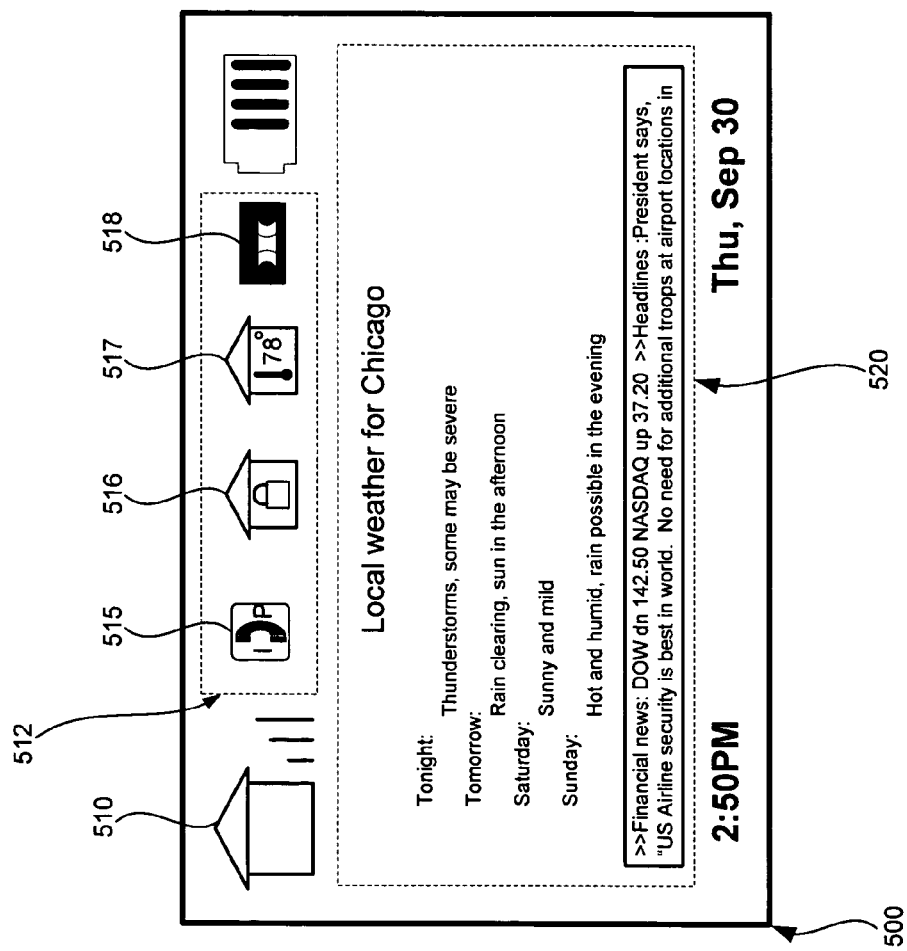
FIG. 5A shows an illustration of an exemplary display that may be visible on an access device that may correspond, for example, to the access device of FIG. 4, upon entering into wireless communication with a broadband access gateway such as, for example, the gateway, in accordance with a representative embodiment of the present invention.

FIG. 5A shows an illustration of an exemplary display 500 that may be visible on an access device that may correspond, for example, to the access device 124 of FIG. 4, upon entering into wireless communication with a broadband access gateway such as, for example, the gateway 118, in accordance with a representative embodiment of the present invention. The display 500 of FIG. 5A comprises a network indicator 510, a network services indicator area 512, a battery life indicator, a time of day indicator, and a day and date indicator. The display 500 also comprises a display area 520 to allow an access device to present graphical or textual information for a variety of reasons and from a number of sources. Upon arriving within the coverage area of a wireless broadband access gateway such as, for example, the gateway 118 of FIG. 4, an access device in accordance with a representative embodiment of the present invention may receive information regarding available multimedia information and services including, for example, the presence of other access devices, smart appliances, and premise systems of which the gateway 118 is aware. Information may also be provided indicating those devices that support external configuration and control. The display 500 of the access device 124 may then be updated to reflect the received information. For example, in the illustration of FIG. 5A, the network indicator 510 shows the presence of a personal area network, and the network services indicator area 512 has been updated to comprise an Internet protocol (IP) phone service icon 515, a residential security system icon 516, an environmental control system icon 517, and a video cassette recorder (VCR) control icon 518, representing the services, access devices, smart appliances, and premise systems advertised by the wireless broadband access gateway as being available to an appropriately identified or authorized user of the access device with the display 500. The appearance of such icons may be used to signal that the corresponding devices/systems permit configuration and/or control via the gateway 118.

Figure 5B:
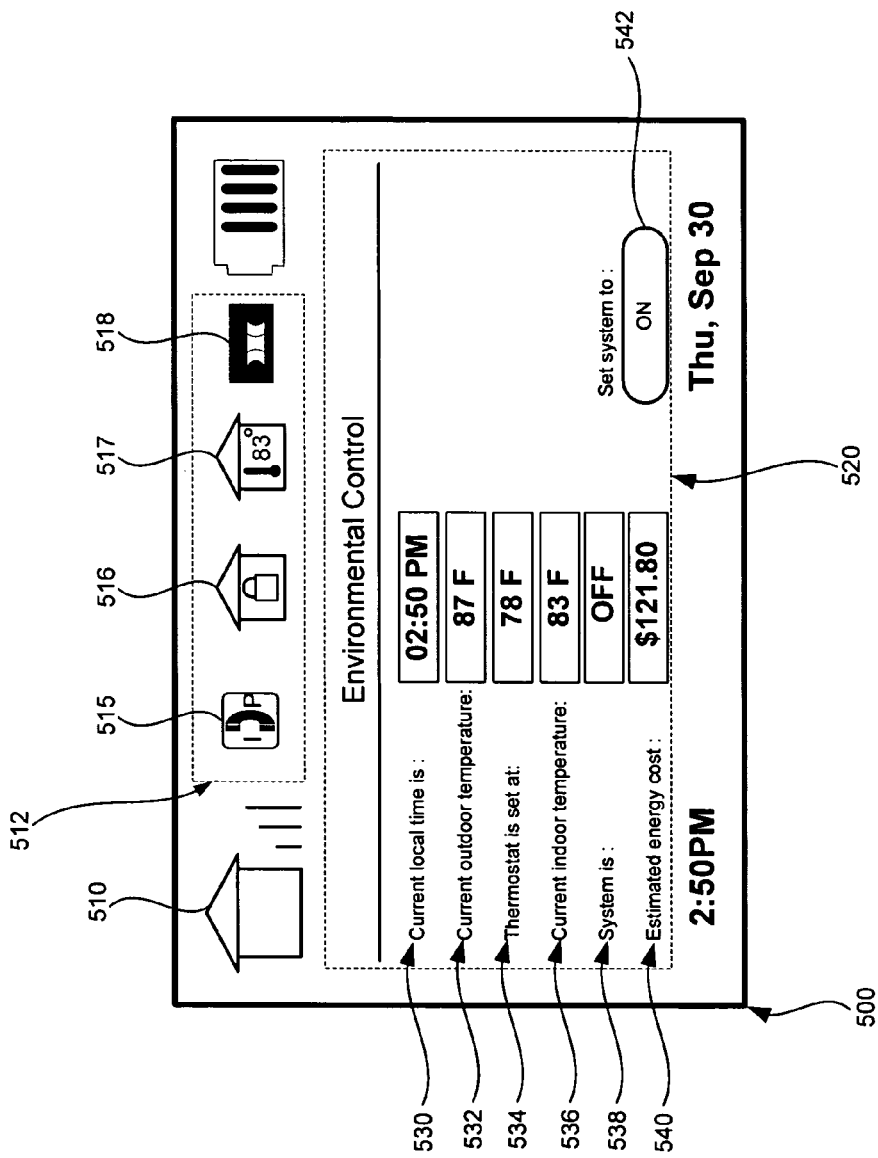
FIG. 5B is an illustration of an exemplary environmental control system screen that may be shown in the display of an access device such as, for example, the access device of FIG. 4 following user selection of the environment control system icon of FIG. 5A, in accordance with a representative embodiment of the present invention.

FIG. 5B is an illustration of an exemplary environmental control system screen 520 that may be visible in the display 500 of an access device such as, for example, the access device 124 of FIG. 4 following user selection of the environment control system icon 517 of FIG. 5A, in accordance with a representative embodiment of the present invention. The display 500 of FIG. 5B comprises a network indicator 510, a network services indicator area 512, a battery life indicator, a time of day indicator, and a day and date indicator. The display 500 also comprises a display area 520 to allow an access device to present graphical or textual information for a variety of reasons and from a number of sources. The network services indicator area 512 shown in FIG. 5B comprises an Internet protocol (IP) phone service icon 515, a residential security system icon 516, an environmental control system icon 517, a video cassette recorder (VCR) control icon 518. In the illustration of FIG. 5B, the display area 520 has been updated to show a number of parameters that indicate the state of the environment control system of the location 102. As shown in the example of FIG. 5B, the display area 520 includes a current local time field 530, a current outdoor temperature field 532, a thermostat setting field 534, a current indoor temperature field 536, a system state field 538, an estimated energy cost field 540, and a soft button 542. As indicated by the fields 530, 532, 534, 536, 538, 540, respectively, the time at the gateway 118 is 2:50 PM, the outdoor temperature is 87 degrees F, the thermostat is set at 78 degrees F, the indoor temperature is currently 83 degrees F, the environmental control system is "OFF", and the current estimated energy cost is $121.80. According to the illustration of FIG. 5B, the user of the access device 124 may turn the environmental control system to "ON" by selecting the soft button 542. Although the example of FIG. 5B is a simplified form that may be most suitable for small display sizes, the details illustrated in FIG. 5B do not represent limitations of the present invention. Other forms of expression of the information used in the configuration and control of the access device, smart appliances, and premise system as described above may be employed, without departing from the spirit and scope of the present invention. The functionality represented by the illustration of FIG. 5B may be employed by access devices such as, for example, the access device 124, the wireless PDA 119, the laptops 117, 170, and the PC 138 of FIG. 4.

Figure 5C:
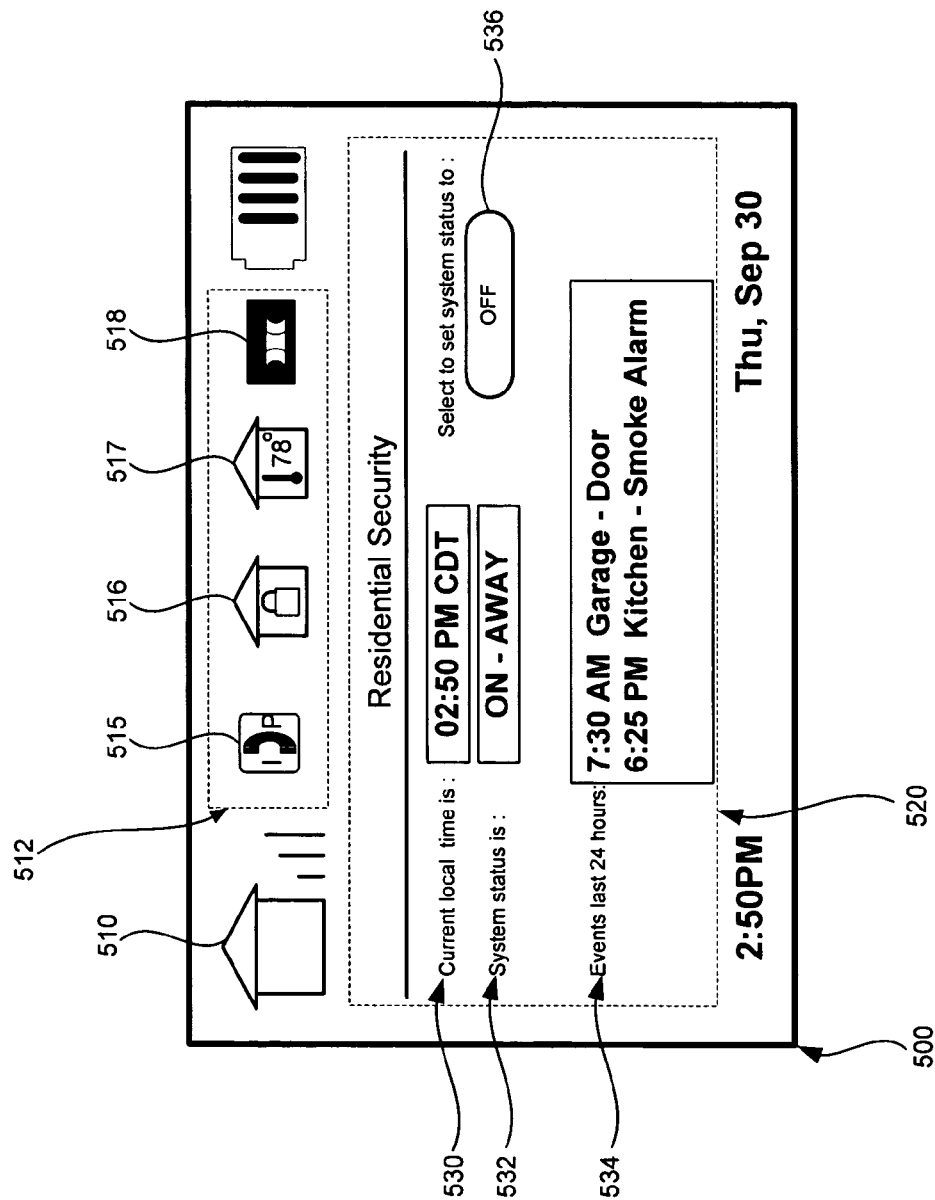
FIG. 5C is an illustration of an exemplary residential security system screen that may be shown in the display of an access device such as, for example, the access device of FIG. 4 following user selection of the residential security system icon of FIG. 5A, in accordance with a representative embodiment of the present invention.

FIG. 5C is an illustration of an exemplary residential security system screen 520 that may be shown in the display 500 of an access device such as, for example, the access device 124 of FIG. 4 following user selection of the residential security system icon 516 of FIG. 5A, in accordance with a representative embodiment of the present invention. For the sake of clarity, the following description of FIG. 5C makes reference to the elements of FIG. 4. The display 500 of FIG. 5C comprises a network indicator 510, a network services indicator area 512, a battery life indicator, a time of day indicator, and a day and date indicator. The display 500 also comprises a display area 520 to allow an access device to present graphical or textual information for a variety of reasons and from a number of sources. The network services indicator area 512 shown in FIG. 5C comprises an Internet protocol (IP) phone service icon 515, a residential security system icon 516, an environmental control system icon 517, a video cassette recorder (VCR) control icon 518. In the illustration of FIG. 5C, the display area 520 has been updated to show a number of parameters indicating the state of the residential security system 129 at the location 102. As shown in the example of FIG. 5C, the display area 500 includes a current local time field 530, a system status field 532, an event field 534, and a soft button 536. As indicated by the fields 530, 532, 534, respectively, the time at the gateway 118 is 2:50 PM, the current system state is "ON-AWAY" indicating that the system is active and the occupants of location 102 are out of the premise, and two security events have occurred in the last 24 hours. The illustration of FIG. 5C shows that the user of the access device 124 may turn the residential security system 129 to "OFF" by selecting the soft button 536. The example of FIG. 5C is a simplified form that may be most suitable for small display sizes, however, the details of the illustration of FIG. 5C do not represent limitations of the present invention. Other graphical elements and text may be present, and other forms of expression may be used, without departing from the spirit and scope of the present invention. The functionality represented by the illustration of FIG. 5C may be employed by access devices such as, for example, the access device 124, the wireless PDA 119, the laptops 117, 170, and the PC 138 of FIG. 4.

Figure 6:
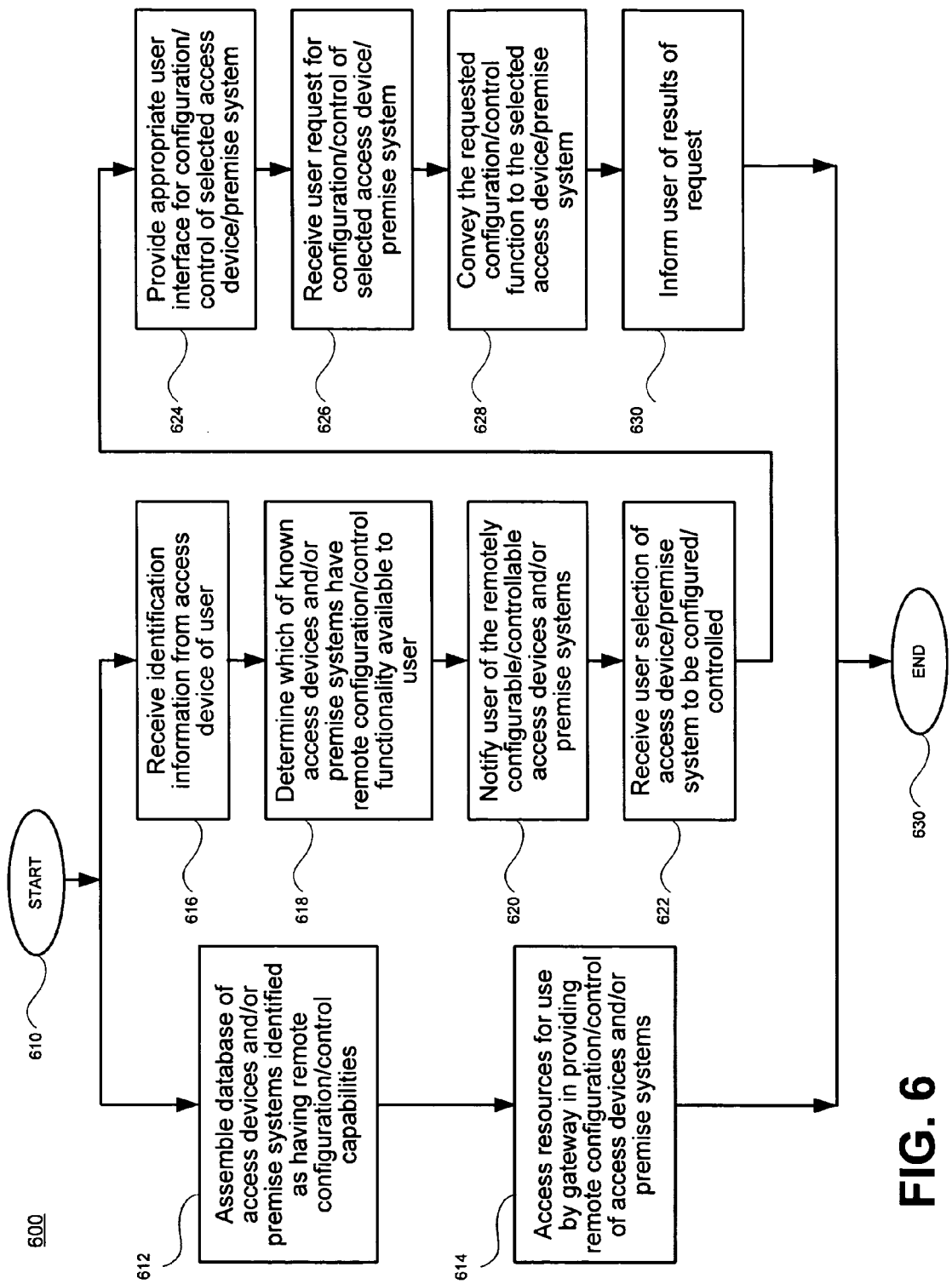
FIG. 6 shows a flowchart of an exemplary method supporting local and remote control via a broadband access gateway such as, for example, the gateway of FIGS. 3 and 4 in accordance with an embodiment of the present invention.

FIG. 6 shows a flowchart of an exemplary method supporting local and remote control via a broadband access gateway such as, for example, the gateway 118 of FIGS. 3 and 4, in accordance with an embodiment of the present invention. As an aid to understanding, the following description of the method of FIG. 6 makes reference to the elements of FIG. 4. The flowchart of FIG. 6 is arranged having a left and a right path, to illustrate that the activities of the two paths may proceed in parallel. The method of FIG. 6 begins when a broadband access gateway such as, for example, the gateway 118 is powered up (block 610). In the left path of FIG. 6, the gateway 118 may proceed to assemble a database of access devices, smart appliances, and premise systems identified as having remote configuration/control capabilities (block 612). For example, in the illustration of FIG. 4, the gateway 118 may collect information from each of the access devices with which it is in communication such as, for example, the stereo system 105, the laptop 117, the wireless PDA 119, and the personal video recorder 123. Such information may be received, for example, during the registration of an access device as described above, or may be provided by a user. In addition, the gateway 118 may receive information about the premise systems at location 102 such as, for example, the security system 129 and the environmental control system 131. The gateway 118 may then access resources for use by the gateway in providing remote configuration/control of access devices and/or premise systems (block 614). Such resources may comprise user interface and communication software applications such as, for example, the applications 153 of the gateway 118 in FIGS. 3 and 4 that enable the gateway 118 to facilitate the configuration and/or control of the access device/premise system by a user. The resources may be used by the gateway 118 in providing a user interface, to accommodate the interfaces of a variety of different access device/premise systems, or the resources may be sent to the access device of a user such as, for example, the wireless PDA 119 or the access device 124 to support user configuration and control. In such a representative embodiment of the present invention, the resources may comprise, for example, executable code, scripts, or java applets for use on the access device in providing an appropriate user interface. The method illustrated in FIG. 6 then ends at block 630.

In the right path of the flowchart of FIG. 6, a broadband access gateway such as, for example, the gateway 118 of FIG. 4 may receive identification information from the access device of a user (block 616). This may occur, for example, when the access device first comes into communication with the gateway 118, or periodically while in communication with the gateway 118. The information received may become a part of the database referenced above with respect to block 612, and may correspond to, for example, the database 152 of FIGS. 3 and 4. Next, a representative embodiment of the present invention may determine which of the known access devices and/or premise systems have remote configuration/control functionality available to the user (block 618). Using that information, the gateway 118 may notify the user of the available remotely configurable/controllable access devices and/or premise systems (block 620). Notification may comprise, for example, the appearance of a text message or icon on the display of the access device of the user. The gateway 118 may then receive a user selection of an access device, smart appliance, or premise system to be configured/controlled (block 622). Based upon the access device, smart appliance, or premise system selected by the user, the gateway 118 may provide an appropriate user interface for configuration/control of the selected access device/premise system (block 624). This may involve, for example, the resources described above with respect to block 614 (e.g., downloading an applet, script, or executable code to the access device). Aspects of the user interface may be subject to the privileges of the user, as determined by the identification information provided when the user access device first entered into communication with the gateway 118, or received at a later time while in communication with the gateway 118.

Next, the gateway 118 may receive a user request for configuration/control of the selected access device, smart appliance or premise system (block 626). In a representative embodiment of the present invention, the user request may be limited to those options provided in the user interface described above with respect to block 624. The gateway 118 may then convey the user-requested configuration/control function to the selected access device/premise system (block 628). The capabilities of a broadband access gateway in accordance with a representative embodiment of the present invention free the user from a need to be familiar with all of the peculiarities of each access device and premise system, by providing a more uniform user interface "look and feel". This is provided in a representative embodiment of the present invention by functionality in the gateway that adapts user requests to be compatible with specific access device, smart appliance, and premise system interfaces. Once the gateway 118 has forwarded the user request to the selected access device or premise system, the gateway 118 may inform the user of the results of the request (e.g., success, failure, the current temperature, provide the requested security system status). The method of the right path of FIG. 6 then ends (block 630).

In a representative embodiment of the present invention, a user of an access device such as those described above with respect to FIGS. 1-4 may be afforded the same configuration and control capabilities whether within the coverage area of a broadband access gateway such as, for example, the gateway 118, or when being served by a wireless WAN such as, for example, the GSM network 114, or a wired connection via, for example, the Internet 140 of FIGS. 1 and 2. A broadband access gateway in accordance with a representative embodiment of the present invention provides for the user a flexible and adaptive intermediary to free the user from the specific interfaces of the variety of access devices and premise systems that have been described above.

Aspects of the present invention may be found in a system supporting remote configuration and control of a plurality of access devices via a broadband access gateway. Such a system may comprise a gateway communicatively coupled to a broadband network and at least one wireless interface. The gateway may be capable of selectively exchanging multimedia information among the at least one wireless interface and the broadband network, and of communicating with the plurality of access devices via the at least one wireless interface. The gateway may be capable of collecting, from at least a portion of the plurality of access devices, information identifying access device behavior that may be remotely initiated, and of receiving, from a first one of the plurality of access devices, a first message requesting that a second one of the plurality of access devices perform an identified behavior. In addition, the gateway may be capable of adapting the first message to a second message compatible with the second one of the plurality of access devices based upon the first message and the collected information, and may be capable of delivering the second message to the second one of the plurality of access devices.

In a representative embodiment of the present invention, multimedia information may comprise at least one of streaming video, broadcast video, voice, digital data, text, digitized audio, digitized still images, digitized video, and digitized music. The information identifying access device behavior that may be remotely initiated may comprise at least one of an electronic serial number, an Internet protocol (IP) address, a media access control (MAC) address, an International Mobile Station Identifier (IMSI) address, a Mobile Identification Number (MIN) address, a manufacturer identifier, a model identifier, and a type identifier. The information identifying access device behavior that may be remotely initiated may also comprise at least one of accessing, recording, playing, exchanging, transmitting, receiving, converting, translating, enabling, disabling, configuring, monitoring, administering, and scheduling. The at least one wireless interface may be compliant with the Bluetooth V1.2 or compatible personal area network (PAN) specification. The at least one wireless interface may communicate using an unlicensed frequency band, and may communicate at a frequency of approximately 2.4 gigahertz. In addition, the at least one wireless interface may be compliant with at least one of the Institute of Electrical and Electronics Engineers (IEEE) 802.11a, 802.11b, 802.11g, and 802.11n standards. In various representative embodiments of the present invention, the broadband network may comprise at least one of a digital subscriber line (DSL) network, a cable network, a satellite network, a cellular network, and the Internet. The cellular network may comprise at least one of a global system for mobile communications (GSM) network, a time division multiple access (TDMA) network, a code division multiple access (CDMA) network, and a universal mobile telecommunications system (UMTS) network.

The gateway in a representative embodiment of the present invention may be capable of receiving information identifying at least one of an access device and a user from the at least a portion of the plurality of access devices, and of authenticating the request from the first one of the plurality of access devices based upon the received information. The information identifying a user may comprise at least one of a member identifier, a user name, an administrative identifier, and a credit card number. The information identifying an access device may comprise at least one of an electronic serial number, an Internet protocol (IP) address, a media access control (MAC) address, a manufacturer identifier, a model identifier, and a type identifier. The plurality of access devices may comprise at least one of a mobile multimedia handset, a personal digital assistant (PDA), a personal computer (PC), a digital scanner, a digital camera, a security system, a heating system, and a cooling system. In a representative embodiment of the present invention, the request may be received via the at least one wireless interface, and via the broadband network. The gateway may deliver at least one of executable code, a script, and an applet to the first of the plurality of access devices to support one of remote configuration and remote control.

Additional aspects of the present invention may be seen in a method for supporting remote configuration and control of a plurality of access devices via a broadband access gateway. A method in accordance with a representative embodiment of the present invention may comprise collecting, from at least a portion of the plurality of access devices, information identifying access device behavior that may be remotely initiated. The method may comprise receiving, from a first one of the plurality of access devices, a first message requesting that a second one of the plurality of access devices perform an identified behavior. In addition, the method may comprise adapting the first message to a second message compatible with the second one of the plurality of access devices based upon the first message and the collected information, and delivering the second message to the second one of the plurality of access devices.

In various representative embodiments of the present invention, multimedia information may comprise at least one of streaming video, broadcast video, voice, digital data, text, digitized audio, digitized still images, digitized video, and digitized music. The information identifying access device behavior that may be remotely initiated may comprise at least one of an electronic serial number, an Internet protocol (IP) address, a media access control (MAC) address, an International Mobile Station Identifier (IMSI) address, a Mobile Identification Number (MIN) address, a manufacturer identifier, a model identifier, and a type identifier. The information identifying access device behavior that may be remotely initiated may also comprise at least one of accessing, recording, playing, exchanging, transmitting, receiving, converting, translating, enabling, disabling, configuring, monitoring, administering, and scheduling. A method in accordance with a representative embodiment of the present invention may also comprise exchanging multimedia information among at least one wireless interface and a broadband network. The at least one wireless interface may be compliant with the Bluetooth V1.2 or compatible personal area network (PAN) specification. The at least one wireless interface may communicate using an unlicensed frequency band, and may communicate at a frequency of approximately 2.4 gigahertz. The at least one wireless interface may be compliant with at least one of the Institute of Electrical and Electronics Engineers (IEEE) 802.11a, 802.11b, 802.11g, and 802.11n standards. The broadband network may comprise at least one of a digital subscriber line (DSL) network, a cable network, a satellite network, a cellular network, and the Internet. The cellular network may comprise at least one of a global system for mobile communications (GSM) network, a time division multiple access (TDMA) network, a code division multiple access (CDMA) network, and a universal mobile telecommunications system (UMTS) network.

In a representative embodiment of the present invention, the gateway may be capable of receiving information identifying at least one of an access device and a user from the at least a portion of the plurality of access devices, and of authenticating the request from the first one of the plurality of access devices based upon the received information. The information identifying a user may comprise at least one of a member identifier, a user name, an administrative identifier, and a credit card number. The information identifying an access device may also comprise at least one of an electronic serial number, an Internet protocol (IP) address, a media access control (MAC) address, a manufacturer identifier, a model identifier, and a type identifier. The plurality of access devices may comprise at least one of a mobile multimedia handset, a personal digital assistant (PDA), a personal computer (PC), a digital scanner, a digital camera, a security system, a heating system, and a cooling system. The request may be received via a wireless interface, and may be received via a broadband network. In addition, the gateway may deliver at least one of executable code, a script, and an applet to the first of the plurality of access devices to support one of remote configuration and remote control.

Yet other aspects of the present invention may be observed in a machine-readable storage, having stored thereon a computer program having a plurality of code sections executable by a machine, for causing the machine to perform the operations of the method described above.

In a representative embodiment of the present invention, the wireless local area networks may include data networks such as, for example, Institute of Electrical and Electronics Engineer (IEEE) 802.11 a/b/g/n compliant wireless networks such as those located in homes, hot spots or an office. Such local area networks may operate in unlicensed radio frequency spectrum such as in, for example, the 2.4 and 5 gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1×RT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineer (IEEE) 802.15.3a compliant wireless networks. Such personal area networks may operate in unlicensed radio frequency spectrum such as, for example, the 2.4 and 5 gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are important because all the information coming into and leaving the home from either the WAN side (i.e., the broadband connection side), or from the PAN side (i.e., the access device side) converges at the gateway. The PAN side may comprise Bluetooth, wireless LAN (IEEE 802.11a/b/g/n), IEEE 802.15.3a ultra-wideband, or cellular, for example. Notwithstanding, the gateway may be adapted to convert, for example, wirelessly received GSM-formatted information into, for example, Internet protocol (IP)-formatted information and in reverse, converts IP-formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention may leverage existing broadband infrastructure that is commonly found in many homes and businesses today. Because a consumer is already paying for the use of the broadband infrastructure in their home or office, leveraging the use of the existing broadband infrastructure for communication with wide area networks results in minimal or no communication costs. The broadband infrastructure may be, for example, a cable or DSL infrastructure.

The wireless interface function provided by the gateway located within a home, for example, may be utilized to route or communicate a great deal of traffic to a wired network such as a broadband network or a wireless network such as a GSM or CDMA network via a broadband connection. In other words, the wireless gateway infrastructure provided by a representative embodiment of the present invention provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power. The gateways of existing systems fall short of realizing the full potential of the merged wired and wireless communication network that is enabled by a representative embodiment of the present invention. Numerous basic and enhanced communication services may be enabled or provided by the gateway. Support for access devices such as, for example, mobile multimedia handsets and PDAs may be involved in order to utilize these basic and enhanced communication services enabled by the new wave of digital technologies. Current and/or proposed mobile access gateway systems, however, do not provide the range of support needed for their use by the everyday consumer.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system supporting remote configuration and control of a plurality of access devices via a broadband access gateway, the system comprising:

a gateway communicatively coupled to a broadband network and at least one wireless interface, the gateway configured to selectively communicate multimedia information among the at least one wireless interface and the broadband network, and communicate with the plurality of access devices via the at least one wireless interface;

the gateway configured to collect, from at least a portion of the plurality of access devices, information identifying each access device and a corresponding set of services that may be remotely initiated;

the gateway configured to transmit at least a portion of the collected information to a first one of the plurality of access devices, when the first one of the plurality of access devices is detected to be communicatively coupled to the gateway;

the gateway configured to receive, from the first one of the plurality of access devices, a user selection of a second one of the plurality of access devices;

the gateway configured to provide to the first one of the plurality of access devices, responsive to the user selection of the second one of the plurality of access devices, a set of instructions executed on the first one of the plurality of access devices to produce a user interface appropriate for configuration/control of the second one of the plurality of access devices, wherein aspects of the user interface for configuration/control of the second one of the plurality of access devices are subject to the privileges of the user of the first one of the plurality of access devices, as determined by the gateway using the information identifying the first one of the plurality of access devices collected by the gateway;

the gateway configured to receive, from the first one of the plurality of access devices, a first message requesting that the second one of the plurality of access devices perform an identified service;

the gateway configured to adapt the first message to a second message compatible with the second one of the plurality of access devices based upon the first message and the collected information; and the gateway configured to deliver the second message to the second one of the plurality of access devices.

2. The system according to claim 1 wherein multimedia information comprises at least one of: streaming video, broadcast video, voice, digital data, text, digitized audio, digitized still images, digitized video, and digitized music.

3. The system according to claim 1 wherein the information identifying each access device comprises at least one of: an electronic serial number, an Internet protocol (IP) address, a media access control (MAC) address, an International Mobile Station Identifier (IMSI) address, a Mobile Identification Number (MIN) address, a manufacturer identifier, a model identifier, and a type identifier.

4. The system according to claim 1 wherein the set of services that may be remotely initiated comprises at least one of: accessing, recording, playing, exchanging, transmitting, receiving, converting, translating, enabling, disabling, configuring, monitoring, administering, and scheduling.

5. The system according to claim 1 wherein the at least one wireless interface is compliant with the Bluetooth V1.2 or compatible personal area network (PAN) specification.

6. The system according to claim 1 wherein the at least one wireless interface communicates using an unlicensed frequency band.

7. The system according to claim 1 wherein the at least one wireless interface communicates at a frequency of approximately 2.4 gigahertz.

8. The system according to claim 1 wherein the at least one wireless interface is compliant with at least one of: the Institute of Electrical and Electronics Engineers (IEEE) 802.11a, 802.11b, 802.11g, and 802.11n standards.

9. The system according to claim 1 wherein the broadband network comprises at least one of: a digital subscriber line (DSL) network, a cable network, a satellite network, a cellular network, and the Internet.

10. The system according to claim 9 wherein the cellular network comprises at least one of: a global system for mobile communications (GSM) network, a time division multiple access (TDMA) network, a code division multiple access (CDMA) network, and a universal mobile telecommunications system (UMTS) network.

11. The system according to claim 1, further comprising:
the gateway configured to receive information identifying at least one of: an access device and a user from the at least a portion of the plurality of access devices; and
the gateway configured to authenticate the request from the first one of the plurality of access devices based upon the received information.

12. The system according to claim 11 wherein the information identifying a user comprises at least one of: a member identifier, a user name, an administrative identifier, and a credit card number.

13. The system according to claim 1 wherein the plurality of access devices comprises at least one of: a mobile multimedia handset, a personal digital assistant (PDA), a personal computer (PC), a digital scanner, a digital camera, a security system, a heating system, and a cooling system.

14. The system according to claim 1 wherein the request is received via the at least one wireless interface.

15. The system according to claim 1 wherein the request is received via the broadband network.

16. The system according to claim 1 wherein the gateway delivers at least one of: executable code, a script, and an applet to the first of the plurality of access devices to support one of remote configuration and remote control.

17. The system of claim 1, wherein the gateway is capable of downloading one or more of an applet, a script, or executable code to the first one of the plurality of access devices when providing the set of instructions to the first one of the plurality of access devices.

18. A method for supporting remote configuration and control of a plurality of access devices via a broadband access gateway, the method comprising:
collecting, from at least a portion of the plurality of access devices, information identifying each access device and a corresponding set of services that may be remotely initiated;
transmitting at least a portion of the collected information to a first one of the plurality of access devices, when the first one of the plurality of access devices is detected to be communicatively coupled to the broadband access gateway;
receiving, from the first one of the plurality of access devices, a user selection of a second one of the plurality of access devices;
providing to the first one of the plurality of access devices, responsive to the user selection of the second one of the plurality of access devices, a set of instructions executed on the first one of the plurality of access devices to produce a user interface appropriate for configuration/control of the second one of the plurality of access devices, wherein aspects of the user interface for configuration/control of the second one of the plurality of access devices are subject to the privileges of the user of the first one of the plurality of access devices, as determined by using the information identifying the first one of the plurality of access devices;
receiving, from the first one of the plurality of access devices, a first message requesting that the second one of the plurality of access devices perform an identified service;
adapting the first message to a second message compatible with the second one of the plurality of access devices based upon the first message and the collected information; and
delivering the second message to the second one of the plurality of access devices.

19. The method according to claim 18 wherein multimedia information comprises at least one of: streaming video, broadcast video, voice, digital data, text, digitized audio, digitized still images, digitized video, and digitized music.

20. The method according to claim 18 wherein the information identifying each access device comprises at least one of: an electronic serial number, an Internet protocol (IP) address, a media access control (MAC) address, an International Mobile Station Identifier (IMSI) address, and a Mobile Identification Number (MIN) address, a manufacturer identifier, a model identifier, and a type identifier.

21. The method according to claim 18 wherein the set of services that may be remotely initiated comprises at least one of: accessing, recording, playing, exchanging, transmitting, receiving, converting, translating, enabling, disabling, configuring, monitoring, administering, and scheduling.

22. The method according to claim 18 further comprising:
communicating multimedia information among at least one wireless interface and a broadband network.

23. The method according to claim 22 wherein the at least one wireless interface is compliant with the Bluetooth V1.2 or compatible personal area network (PAN) specification.

24. The method according to claim 22 wherein the at least one wireless interface communicates using an unlicensed frequency band.

25. The method according to claim 22 wherein the at least one wireless interface communicates at a frequency of approximately 2.4 gigahertz.

26. The method according to claim 22 wherein the at least one wireless interface is compliant with at least one of: the Institute of Electrical and Electronics Engineers (IEEE) 802.11a, 802.11b, 802.11g, and 802.11n standards.

27. The method according to claim 22 wherein the broadband network comprises at least one of: a digital subscriber line (DSL) network, a cable network, a satellite network, a cellular network, and the Internet.

28. The method according to claim 27 wherein the cellular network comprises at least one of: a global system for mobile communications (GSM) network, a time division multiple access (TDMA) network, a code division multiple access (CDMA) network, and a universal mobile telecommunications system (UMTS) network.

29. The method according to claim 18, further comprising:
the gateway configured to receive information identifying at least one of: an access device and a user, from the at least a portion of the plurality of access devices; and
the gateway configured to authenticate the request from the first one of the plurality of access devices based upon the received information.

30. The method according to claim 29 wherein the information identifying a user comprises at least one of: a member identifier, a user name, an administrative identifier, and a credit card number.

31. The method according to claim 18 wherein the plurality of access devices comprises at least one of: a mobile multimedia handset, a personal digital assistant (PDA), a personal computer (PC), a digital scanner, a digital camera, a security system, a heating system, and a cooling system.

32. The method according to claim 18 wherein the request is received via a wireless interface.

33. The method according to claim 18 wherein the request is received via a broadband network.

34. The method according to claim 18 wherein the gateway delivers at least one of: executable code, a script, and an applet to the first of the plurality of access devices to support one of remote configuration and remote control.

35. The method of claim 18, wherein the providing the set of instructions to the first one of plurality of access devices comprises downloading one or more of an applet, a script, or executable code to the first one of the plurality of access devices.

36. A non-transitory machine-readable storage, having stored thereon a computer program having a plurality of code sections for operating a gateway supporting remote configuration and control of a plurality of access devices, the code sections executable by a machine for causing the machine to perform the operations comprising:
collecting, from at least a portion of the plurality of access devices, information identifying each access device and a corresponding set of services that may be remotely initiated;
transmitting at least a portion of the collected information to a first one of the plurality of access devices, when the first one of the plurality of access devices is detected to be communicatively coupled to the gateway;
receiving, from the first one of the plurality of access devices, a user selection of a second one of the plurality of access devices;
providing to the first one of the plurality of access devices, responsive to the user selection of the second one of the plurality of access devices, a set of instructions executed on the first one of the plurality of access devices to produce a user interface appropriate for configuration/control of the second one of the plurality of access devices, wherein aspects of the user interface for configuration/control of the second one of the plurality of access devices are subject to the privileges of the user of the first one of the plurality of access devices, as determined using the information identifying the first one of the plurality of access devices;
receiving, from the first one of the plurality of access devices, a first message requesting that the second one of the plurality of access devices perform an identified service;
adapting the first message to a second message compatible with the second one of the plurality of access devices based upon the first message and the collected information; and
delivering the second message to the second one of the plurality of access devices.

37. The non-transitory machine-readable storage according to claim 36 wherein multimedia information comprises at least one of: streaming video, broadcast video, voice, digital data, text, digitized audio, digitized still images, digitized video, and digitized music.

38. The non-transitory machine-readable storage according to claim 36 wherein the information identifying each access device comprises at least one of: an electronic serial number, an Internet protocol (IP) address, a media access control (MAC) address, an International Mobile Station Identifier (IMSI) address, and a Mobile Identification Number (MIN) address, a manufacturer identifier, a model identifier, and a type identifier.

39. The non-transitory machine-readable storage according to claim 36 wherein the set of services that may be remotely initiated comprises at least one of: accessing, recording, playing, exchanging, transmitting, receiving, converting, translating, enabling, disabling, configuring, monitoring, administering, and scheduling.

40. The non-transitory machine-readable storage according to claim 36 wherein the code sections executable by a machine further causing the machine to perform the operations comprising:
communicating multimedia information among at least one wireless interface and a broadband network.

41. The non-transitory machine-readable storage according to claim 40 wherein the at least one wireless interface is compliant with the Bluetooth V1.2 or compatible personal area network (PAN) specification.

42. The non-transitory machine-readable storage according to claim 40 wherein the at least one wireless interface communicates using an unlicensed frequency band.

43. The non-transitory machine-readable storage according to claim 40 wherein the at least one wireless interface communicates at a frequency of approximately 2.4 gigahertz.

44. The non-transitory machine-readable storage according to claim 40 wherein the at least one wireless interface is compliant with at least one of: the Institute of Electrical and Electronics Engineers (IEEE) 802.11a, 802.11b, 802.11g, and 802.11n standards.

45. The non-transitory machine-readable storage according to claim 40 wherein the broadband network comprises at least one of: a digital subscriber line (DSL) network, a cable network, a satellite network, a cellular network, and the Internet.

46. The non-transitory machine-readable storage according to claim 45 wherein the cellular network comprises at least one of: a global system for mobile communications (GSM) network, a time division multiple access (TDMA) network, a code division multiple access (CDMA) network, and a universal mobile telecommunications system (UMTS) network.

47. The non-transitory machine-readable storage according to claim 36, wherein the code sections executable by a machine further causing the machine to perform the operations comprising:
receiving information identifying at least one of: an access device and a user, from the at least a portion of the plurality of access devices; and
authenticating the request from the first one of the plurality of access devices based upon the received information.

48. The non-transitory machine-readable storage according to claim 47 wherein the information identifying a user comprises at least one of: a member identifier, a user name, an administrative identifier, and a credit card number.

49. The non-transitory machine-readable storage according to claim 36 wherein the plurality of access devices comprises at least one of: a mobile multimedia handset, a personal digital assistant (PDA), a personal computer (PC), a digital scanner, a digital camera, a security system, a heating system, and a cooling system.

50. The non-transitory machine-readable storage according to claim 36 wherein the request is received via a wireless interface.

51. The non-transitory machine-readable storage according to claim 36 wherein the request is received via a broadband network.

52. The non-transitory machine-readable storage according to claim 36 wherein the gateway delivers at least one of: executable code, a script, and an applet to the first of the plurality of access devices to support one of remote configuration and remote control.

53. The non-transitory machine-readable storage according to claim 36, wherein the providing the set of instructions to the first one of plurality of access devices comprises downloading one or more of an applet, a script, or executable code to the first one of the plurality of access devices.

* * * * *